United States Patent
Anderson

(10) Patent No.: US 12,556,638 B1
(45) Date of Patent: Feb. 17, 2026

(54) SYSTEMS AND METHODS FOR CUSTOMIZING IMAGE FRAMING

(71) Applicant: Rocco's Picture Frames, Inc., Miami, FL (US)

(72) Inventor: David Michael Anderson, Miami, FL (US)

(73) Assignee: ROCCO'S PICTURE FRAMES, INC., Miami, FL (US)

( * ) Notice: Subject to any disclaimer, the term of this patent is extended or adjusted under 35 U.S.C. 154(b) by 362 days.

(21) Appl. No.: 18/152,182

(22) Filed: Jan. 10, 2023

Related U.S. Application Data

(60) Provisional application No. 63/299,049, filed on Jan. 13, 2022.

(51) Int. Cl.
*H04N 1/00* (2006.01)
*B44B 3/00* (2006.01)
*B44C 1/22* (2006.01)

(52) U.S. Cl.
CPC ..... *H04N 1/00188* (2013.01); *H04N 1/00137* (2013.01); *H04N 1/00167* (2013.01); *B44B 3/009* (2013.01); *B44C 1/225* (2013.01)

(58) Field of Classification Search
CPC ............ H04N 1/00188; H04N 1/00167; G06F 3/1253; G06F 3/1257; B44B 3/009; B44C 1/225
See application file for complete search history.

(56) References Cited

U.S. PATENT DOCUMENTS

| | | | | |
|---|---|---|---|---|
| 2003/0058457 | A1* | 3/2003 | Fredlund | H04N 1/00137 358/1.2 |
| 2005/0006357 | A1* | 1/2005 | Connor | B27M 1/06 219/121.69 |
| 2014/0193047 | A1* | 7/2014 | Grosz | G06Q 10/10 382/118 |

OTHER PUBLICATIONS https://web.archive.org/web/20210918204758/http://www.crownawards.com:80/StoreFront/EEE.Team_Photo_Plaques.cat (Year: 2021).*
https://web.archive.org/web/20200805082205/https://www.personalizationmall.com/Create-Your-Own-Engraved-Vertical-Picture-Frame-4x6-i73620.item?productid=26558&sdest=sale-product-cateogry&sdestid=8 (Year: 2020).*

* cited by examiner

*Primary Examiner* — Kent Yip
(74) *Attorney, Agent, or Firm* — ALLEN, DYER, DOPPELT & GILCHRIST, P.A.

(57) ABSTRACT

A system and method and related computer program for customizing photo framing or for otherwise providing options to customize framing of photographs and/or images. The system comprises a data network, a device(s), a user interface and a server. The method comprises allowing a user access to the interface to select a photo size, a photo arrangement, a matte option and upload an image according to such selections. The user may make adjustments to the image such as cropping or editing. The method further comprises checking for minimum requirements as to the image quality and orientation. After successfully uploading the image the user may select a frame type and a matte color. Thereafter, the user may place an order for the customized framing arrangement.

20 Claims, 8 Drawing Sheets

SYSTEMS AND METHODS FOR CUSTOMIZING IMAGE FRAMING

FIELD OF INVENTION

The present invention relates to the field of electronic platforms for customizable photograph and image framing.

BACKGROUND

Framing of photographs, posters, artwork, and other related images has traditionally involved seeking in-person assistance, including for users to physically provide the image(s) to a custom framing establishment. With the advent of digital imagery and photography, however, users have been provided with several options to print images at home. However, art of customizing frames still remains a challenge and involves multiple steps that add time and expense to the overall process. In addition, traditional process do not ensure that the quality of such images is optimized. Accordingly, the industry would benefit from a solution that would overcome the foregoing drawbacks. The industry would benefit from an electronic platform that would allow users to order customized framing options for their photographs and images in a convenient, efficient and user friendly manner. A further benefit would be realized by providing an electronic platform that would allow a user to select an image of his/her choice and customize it according to predetermined framing types and/or matte colors. An even further benefit would be realized if such electronic platform would optimize quality by automatically checking for threshold values as to the image's resolution and/or orientation. Yet a further benefit would be realized by providing an electronic platform that would also give users the option to select customizable engraved plate options.

SUMMARY

A. Overview of System

The present invention is directed to a system, method and associated computer program that may provide various options for users to customize framing of photographs and/or images as well as placing orders pursuant to such customizations. The system generally comprises a device, a data network, an interface and a server, all of which may be operably connected to one another to execute one or more of the inventive features described herein.

B. Overview of Method

The present invention is also directed towards a method of providing various customization options to a user to frame a photograph or image. The method initially comprises allowing a user to select a photo size. Thereafter, the method comprises allowing the user to select a photo arrangement, i.e., portrait or landscape, and alternatively, a plate option that may comprise engraved text as specified by the user. Thereafter, the method generally comprises allowing a user to select a matte option or template, which will surround the image. After the user makes an initial arrangement selection and at least a matte template selection, the user may upload or take a photo, e.g., using a camera of the device. Here, the user may be given the option to select from a library of photographs, or to take his/her own photograph.

Further user options include the ability to crop or edit the uploaded photograph. Thereafter, the method further comprises checking the uploaded photograph for minimum acceptable resolution requirements, and if these are not met, allowing the user to upload/take a different photograph. If such minimum resolution requirements are met, the method may further comprise checking whether the image is properly oriented, i.e., horizontally or vertically, according to the initial user selected layout. If the image is properly oriented, the method further comprises allowing the user to select a specific frame type and/or matte color. Thereafter, the method comprises allowing the user to select ordering options.

DETAILED DESCRIPTION

A. Overview of System

Figure 2:
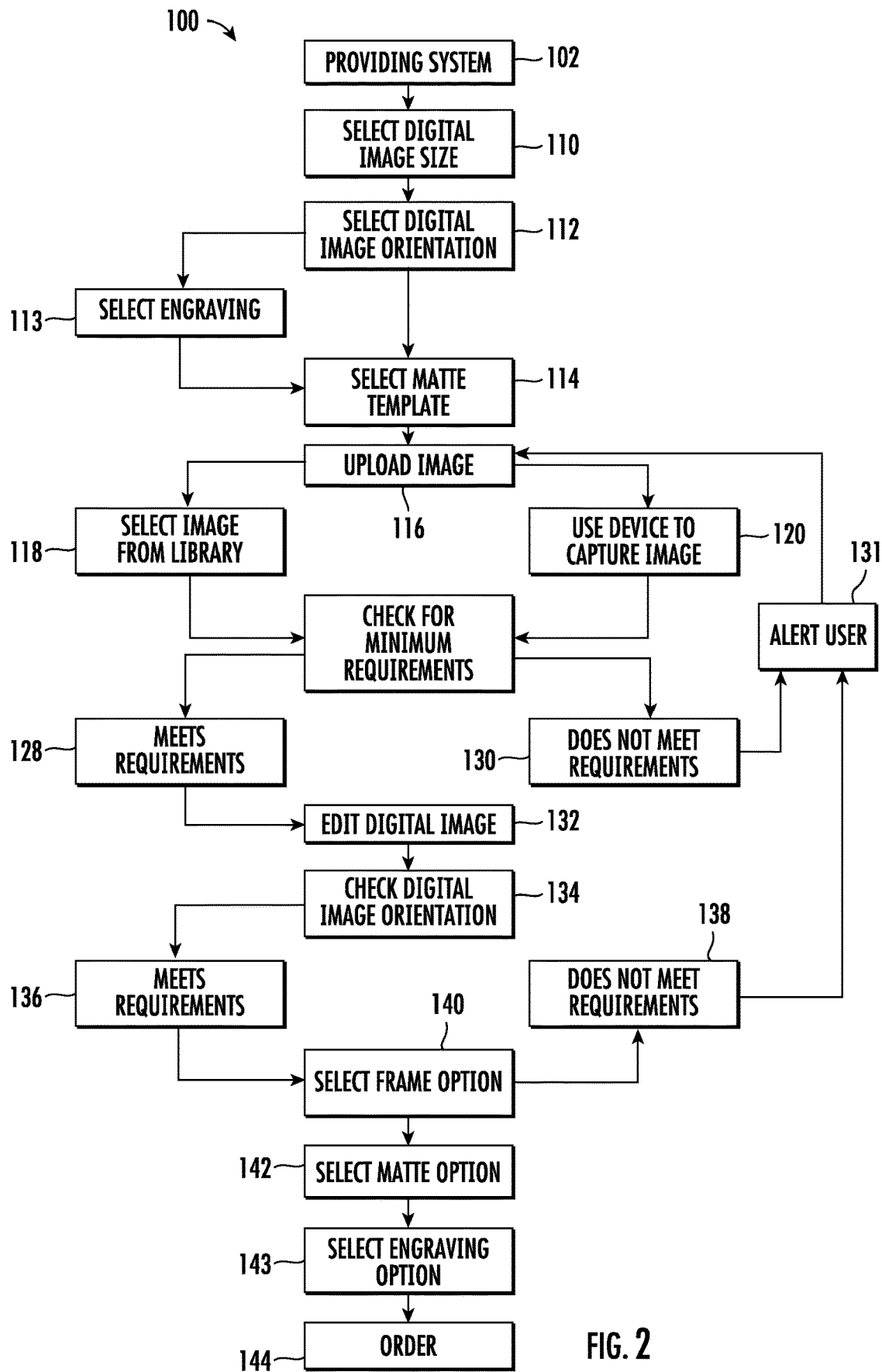
FIG. 2. is a diagrammatic representation of one embodiment the method according to the present invention.

With reference to FIG. 2, the system 1 according to the present invention generally comprises a data network 20, a device 10, an interface or electronic platform 30 and/or a server 40. The system 1 may comprise at least one device 10, thorough which the operative features of the present invention may be accessed. The device(s) 10, may be operatively connected to a data network 20, for example, through a variety of communication protocols, including, without limitation, a local area network (LAN), wired area network (WAN), RS-485, ZIGBEE, MODBUS BACNET, Serial, Z-WAVE, generally the Internet, or combinations of the foregoing. An operative communication to the device(s) 10 may also be enabled through various wired and/or wireless mediums including interconnections by routers and/or gateways.

The device(s) 10 may also comprise various types of computers or mobile devices. For example, the device(s) 10 may comprise a desktop computer, a laptop computer, a gaming console, a television or monitor with a processor 60 or another related computing device. As a further example, the device(s) 10 may comprise mobile devices, including, mobile telephones or tablets, i.e., Android or Windows-enabled devices, iPhone or iOS enabled devices, etc., or even mobile gaming consoles. The device(s) 10 may be operatively configured or may comprise executable software to operate with a universal mobile telecommunications service (UMTS), global system for module (GSM), enhanced data GSM environment (EDGE), code-division multiple access (CDMA), time-division multiple access (TDMA), and other related solutions. The device(s) 10 may also comprise a central processing unit (CPU), including a single processing unit or multiple processing units, capable of interpreting and/or processing instructions to execute the various features of the present invention. For example, the device(s) 10 may be provided with multiple processing units.

The device(s) 10 may also comprise memory capabilities 50. The memory capabilities 50 of the device may include, without limitation, computer readable memory in the form of volatile or non-volatile storage, random access memory (RAM), read-only memory (ROM), or an external or internal memory component, i.e., an external hard drive or storage device, or a flash drive, CD, Blu-Ray, DVD, or other related internal or external component. Additionally, the device(s) 10 may be operatively configured to operate via cellular technologies, i.e., 3G, 4G, 5G, GSM, etc.

Figure 1:
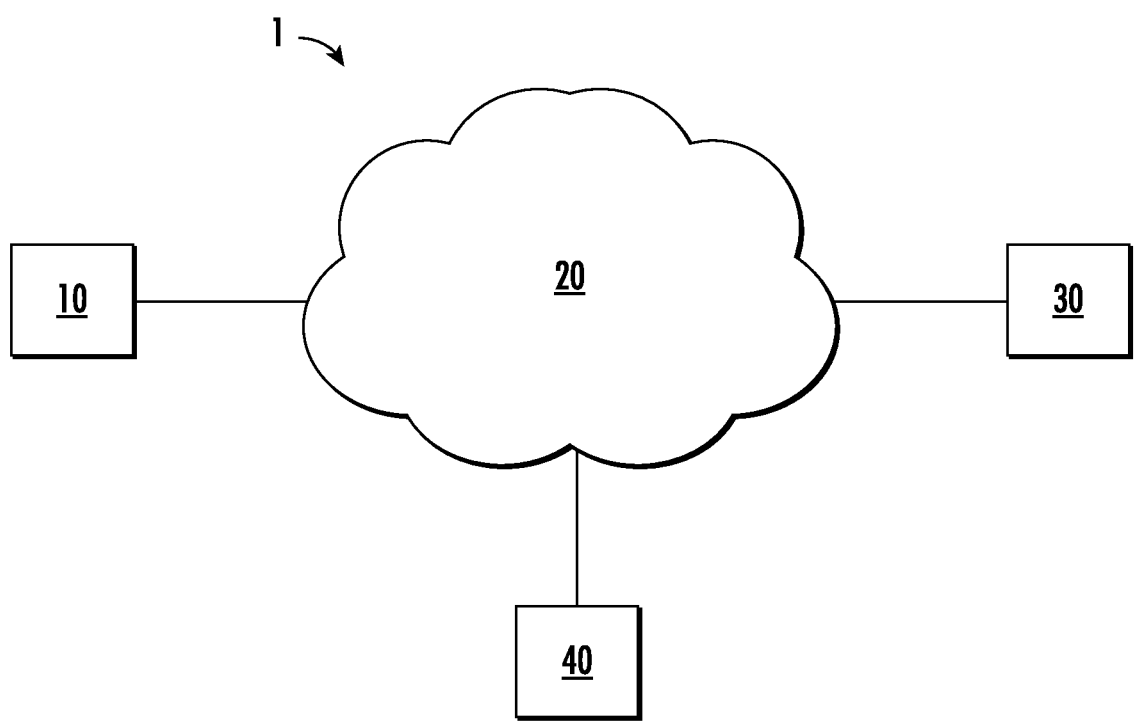
FIG. 1. is a schematic representation of the various components of an illustrative embodiment of the system according to the present invention.

As is also represented in FIG. 1, the system 1 according to the present invention may comprise a server, which is indicated at 40. As used herein, a "server", "server capabilities" or "server services" generally refer to one computer having a suitable hardware and/or installed software or applications, including downloadable, to provide server services. Such server services may include web services and/or other functional services to provide remote access to a user to remotely access an interface 30 from a device 10. The term "interface" may be used to refer to a platform, module, program, web page and/or application, which may be configured to implement one or more of the operative features described herein. For example, various features of the present invention may be implemented through various types of browsers, including, Firefox, Safari, Google Chrome, Internet Explorer, etc.

The device(s) 10 may also comprise a screen, including without limitation, a touch screen configured to ascertain the position and/or command of a finger of the user, and/or other operable component, e.g., electronic pen, stylus pen, or other comparable tool, that can be detected by the screen in a specific location thereof. It is also contemplated that the screen of the device(s) 10 also comprise a material structured to at least partially allow a static charge of the finger of a user to pass there though to ascertain its location and/or function as an operable command or an instruction, for example, by tapping and/or moving or swiping visually displayed items or groups of items to make various selections as will be described herein. Similarly, the screen of the device(s) 10 may be configured to allow the user to swipe and or navigate back and forth through the various windows/screens framing option selections that will be explained herein.

The server 40 may comprise general purpose computers, specialized computers, or other hardware components structured and configured to receive, process, interpret, and/or transmit information between various devices, such as 10, or between a device(s) 10 and the data network 20. Server capabilities 40 may also be operatively configured with executable or interpretable computer code to execute various functions, including, without limitation, various image editing functions, data gathering functions, or even customer support options such as a chat function, as well as a global positioning system (GPS) or tracking function, an advertising function, an appointment management function, an appointment reservation function, a notification function.

The server 40 may comprise a general-purpose computer, including with a central processing unit (CPU), which may be a single-core processor or a multi-core processor. The server 40 may also comprise memory capabilities, e.g., random-access memory, read-only memory, solid state drive (SSD) memory, and/or flash memory. The memory capabilities may also comprise a primary memory, which may enable high-speed storage for executing programs or an electronic storage unit (e.g., hard disk) or a secondary memory for storing data, a communications interface (e.g., network adapter) for communicating with other devices over a network, and/or peripheral device(s) in communication with the CPU that enable input/output of the server capabilities.

The server 40 may be configured to implement the inventive features described today, including via any number of software subsystems, components, or otherwise solution stacks, may include, without limitation, ZEND Server, APACHE Server, NODE.JS, ASP, PHP, Ruby, XAMPP, LAMP, WAMP, MAMP, WISA, LEAP, GLASS, LYME, LYCE, OpenStack, Ganeti, MEAN, MEEN, XRX, and other past, present, or future equivalent solution stacks, or combinations thereof. The software stack(s) might be implemented with or without third-party cloud platforms, for example, using load balancing and virtualization software provided by Citrix, Microsoft, VMware, Map-Reduce, Google Filesystem, Xen, memory caching software such as Memcached and Membase, structured storage software such as MySQL, MariaDB, XtraDB, etc., and/or other platforms. A solution stack(s) according to the present invention may also be deployed in cloud platforms by using known development tools and server hosting services such as GitHub and Rackspace, and their equivalents. The server 40 may also comprise any combination of hardware and software, including code segments in any number of programmable, executable, or interpretable languages.

Further features of the system 1 according to the present invention comprise providing an accessible information database. A user(s) may have access to a database comprising information about a prior configuration and/or order. It is contemplated that such a database may include subcomponents, including without limitation, a user profile database, a transaction or prior order database, a chat database, and/or pricing database for various frame types, matte selections, photograph/frame sizes, expediting options, geographic location, shipment options, etc. The database may also include a global positioning system (GPS) or tracking database.

As shown in FIG. 1, further features of the system 1 according to the present invention comprise providing an interface or electronic platform 30 operatively linked with the device(s) 10. For example, the interface or electronic platform 30 may comprise an application programming interface (API), a graphical user interface (GUI), or another comparable tool or program. The electronic platform 30 is configured to allow a user(s) access to the inventive features as will be defined herein. It is contemplated that various types of interfaces be configured for the specific application, i.e., a user interface, a mobile device interface, a desktop computer device interface, a mobile computer interface, a tablet interface etc. The electronic platform or interface 30 may involve a mobile or desktop application(s) that may downloaded to, accessed, or otherwise implemented on the device(s) 10.

Alternatively, the interface or electronic platform 30 may comprise a browser, including a web browser, mobile browser, or other application or computer program that enables the inventive operative features. Further, the interface or electronic platform 30 may be accessible via wired local area network (LAN) or through a WiFi connection, or via Near-Field Communication (NFC) capabilities. Generally, the interface or electronic platform 30 is configured to obtain information from the user(s), including relating to a user's profile, preferences, and prior orders. As an example, the interface or electronic platform 30 may implemented via a computer program or other interpretable language, including but not limited to, C, C++, HTML, Java, Dart, MATLAB, Swift, Rust, PHP, XHTML, etc.

Accordingly, the inventive system 1 may comprise a user device 10 operatively configured with a built-in or attendant processor 50 to receive various user selections relating to a customization scheme of a digital image display frame, which will be later created and/or manufactured according to the user selections. The system 1 may also comprise an electronic platform 50 operatively configured with the user device 10 to receive a plurality of user selections associated with the frame customization scheme or otherwise pending order. That is, as contemplated herein, the electronic platform 50 should be considered to show a real-time status of the frame customization scheme or otherwise order as the user is making its various selections as to frame types, matte colors, orientation, size, etc. Thus, the system 1 may also comprise a server 40 operatively configured to provide a data connection and/or a data transmission between the user device 10 and the electronic platform 50. Conversely, the processor 60 is operatively configured with the user device 10, the server 40 and the electronic platform 50.

The system 1 may further comprise computer readable memory operatively configured with the processor to execute a set of instructions that when executed allow the user to access the electronic platform 50 via the device 10 to perform a variety of selections associated with the frame customization scheme. As will be explained in further detail below, such selections may comprise, without limitation, selecting an intended printed image size, an intended printed image orientation, a frame scheme with an engraving component, a matte template, a digital image, a frame option, a matte option, etc. Further, once the user has achieved a minimum number of selections associated with the frame customization scheme, the user may place an order to have the frame customization scheme created or manufactured and/or delivered to an intended delivery location.

B. Overview of Method

As mentioned above, and with primary reference to FIG. 2, the present invention is also directed towards a method 100 and associated computer program for customizing photo framing or for otherwise providing options to customize framing of photographs and/or images. As used herein the terms "photograph", "photo" and "image" may be used interchangeably. Accordingly, the present invention contemplates using an electronic platform 30 that a user may access, i.e., through a device(s) 10, to have an image reproduced into a customized frame. That is, the user may upload an image to the electronic platform 50 from the device's 10 memory, or use the device 10 to capture an image that may be uploaded to the electronic platform 50. Thereafter, the method 100 contemplates using various of the components of the inventive system 1 to allow the user to make various customization selections associated with a mock-up of the intended product. Once a minimum number of selections are made, the user(s) may place an order to have the mock-up frame reproduced and shipped/delivered to an intended address.

As such, it is also contemplated that an administrator(s) also has access to the interface 30, including access to administrative features as may be necessary in order to provide support to customers or adjust any current configurations of the system 1 and/or method 100 according to the present invention. For example, a user(s) may contact an administrator for support or for questions regarding image customization or regarding an order or placement of an order. Also, an administrator may login to reset a user's password, ban/restore access to a user(s), access and/or manage support requests, review a user's password, view statistics or data relating to past orders or upcoming orders or review notifications relating to user's reports.

Various authentication protocols may be implemented before a user(s) may login to the interface 30. For example, a user(s) may register his/her credentials and/or otherwise create a profile by inputting information relating to ordering preferences, framing customization preferences, location, payment preferences or other personal information relating as may be necessary or otherwise useful. Alternatively, a user may login through an existing external account, i.e., Facebook account, Google account, etc. As a further example, payment information may comprise credit card information, or banking information as it may relate to transfers. As a further example, a user(s) may be given the option to create and/or customize a profile.

Figure 3:
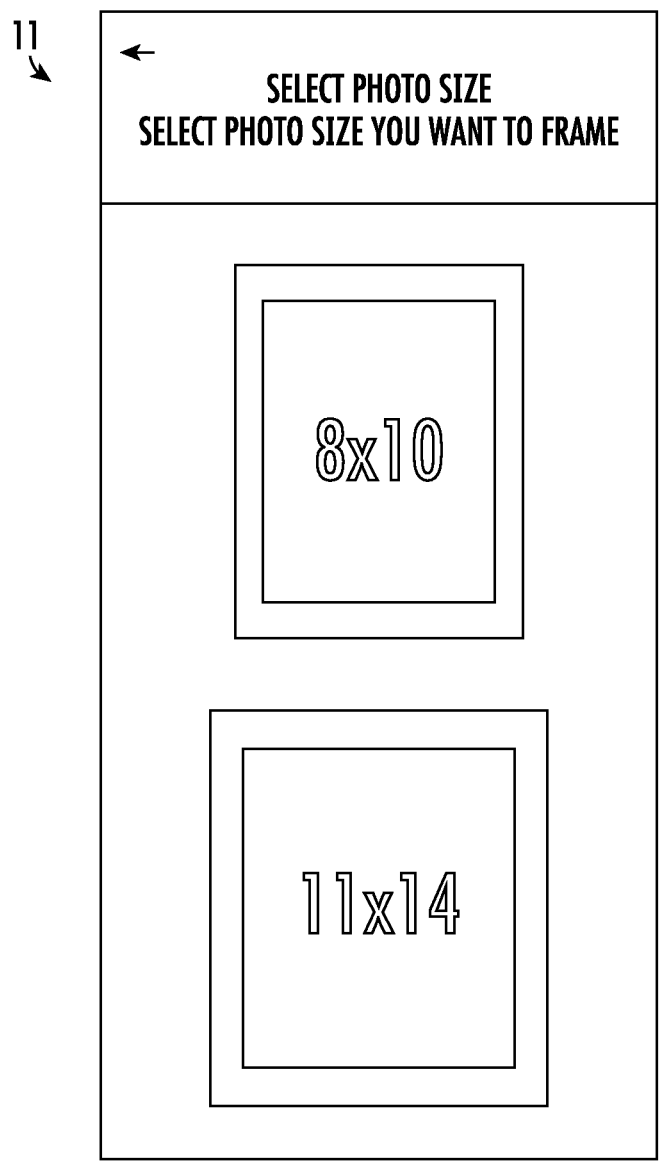
FIG. 3 is a visual representation of one embodiment of a device screen of the system according to the present invention showing a photograph size selection window.

With reference again to FIG. 2, various arrows are used to represent the direction of flow or communication of information as well as the sequence of steps which may be associated with the inventive method 100. As shown at 102, the method 100 comprises providing a system 1 as described herein, including in subsection A above. As indicated at 110, once a user either creates a profile and logs in to the electronic platform 30, or alternatively, once a user accesses the interface 30 as a guest, the method 100 according to the present invention contemplates using the device 10 as well as the electronic platform 20 to allow the user to make various frame customization selections. For example, the method 100 comprises showing on the device's 10 screen an initial window configured to allow the user to select an intended printed image size 110, and/or an intended frame size showing the respective image size. As a further example, this option is shown in FIG. 3, which shows an illustrative embodiment that is representative of the options the user will see to select a photo size. Such option 110, and further subsequent options, may be displayed on a screen of the device(s) 10. Here, the user may select an option to create a new frame and may select one of several predetermined photo sizes, e.g., 8"×10", 11"×14", etc.

This initial selection 110 narrows the amount of available subsequent "templates". For example, if a user selects an 8"×10" photo size, the system 1 may be configured to eliminate all of the available templates comprising other photo sizes, i.e., 11"×14" or other sizes. As shown at 112, after a use makes an initial size selection 110, the user may select an intended image or otherwise photo orientation, which may include, without limitation a portrait arrangement or a landscape arrangement. This selection 112 further narrows the remaining available templates to those only involving the selected size and arrangement. It is contemplated that numerous combinations of various matte options or templates may be initially available to users. By way of example only, these various combinations may include up to 76, or more, template combinations. Thereafter, as shown at 113, the user may be given the option to select a frame with engraving. This, however, is an optional feature and is not strictly required in order to create a customized frame.

Figure 4:
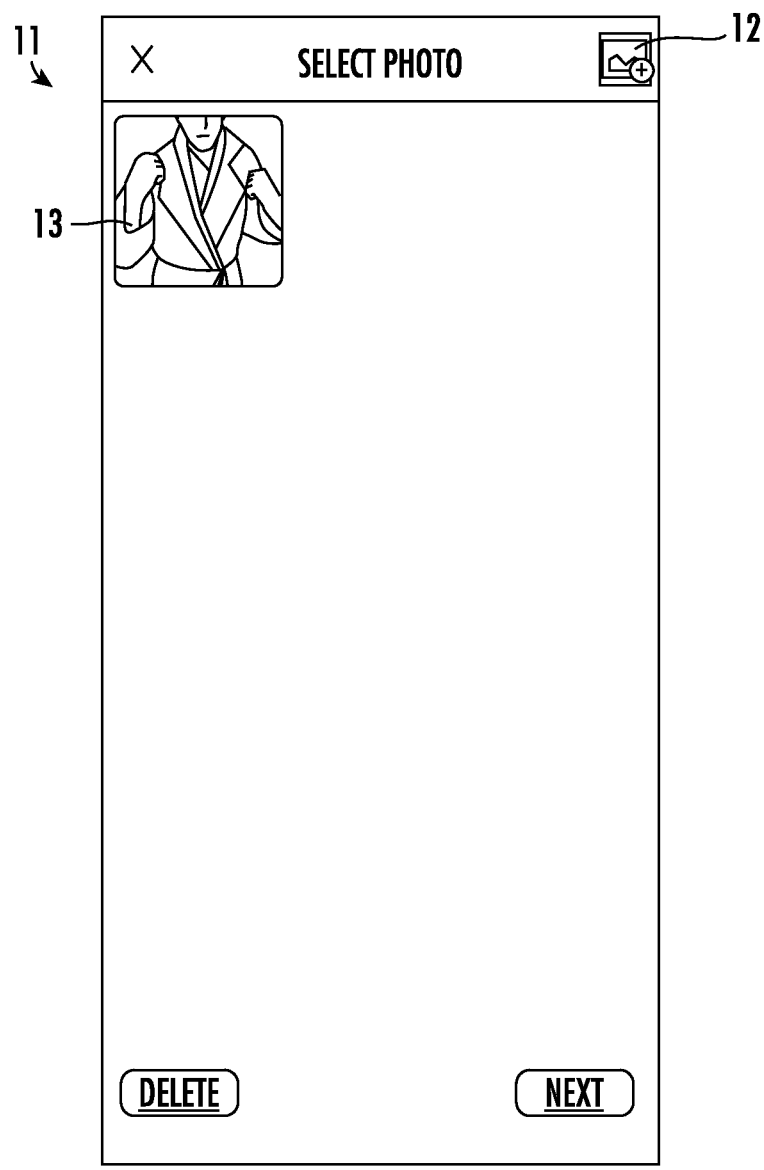
FIG. 4 is a visual representation of another embodiment of a device screen of the system according to the present invention showing a photograph selection from the device's photograph library.

Thereafter, as shown at 114, the user may be given the option to select a matte option. That is the method 100 may further comprise using the device 10 and the electronic platform 50 to select a matte option or template. Here, a user may be shown a graphical measurement indication, e.g., measurement lines, indicating the dimensions (width, length and/or thickness) of the matte template. Visual indications with respect to the dimensions of the matte template may be shown on the screen of the device(s) 10, for example, on a working the frame template. Thereafter, as shown at 116, a user may be given the option to upload a photo on a subsequent window/screen. As shown at 118, and in FIG. 4, this may give the user the option to select an icon 12 to upload a photograph 13 from the device's 10 memory or from a third-party linked account, e.g., Instagram, Facebook, Tik Tok, etc. Alternatively, as shown at 120, the user may also be given the option to take a photograph with a camera of the device(s) 10.

Subsequently, the method 100 may comprise automatically checking for minimum resolution requirements 126. Alternatively, the method may comprise taking the user to other editing options, which may include an option to crop 122 or otherwise edit 124 the uploaded or taken photograph before checking for the minimum resolution requirements 126. It is contemplated that predetermined minimum or threshold values of the resolution of an image may be necessary in order for the method 100 to proceed. Such threshold values may correlate to a number of pixels within an image or portion thereof, and/or may vary according to the orientation and/or size of the image. As a non-limiting example, 8"×10" size images may require a minimum pixel resolution of 1000×1250 for best results. As s further non-limiting example, 11"×14" size images may require a minimum pixel resolution of 1375×1750 for best results. An additional feature of the present invention may comprise an "auto-zoom" feature, which may automatically adjust an image or portion thereof according to a user selection or to optimize the quality of the image.

Thereafter, if the minimum resolution requirements or threshold values for the specific uploaded image are met 128, the method 100 comprises allowing the user the option to edit the digital image 132. Once the user is done with editing the image, which may comprise making adjustments to various data characteristics of the native file, such as, brightness, contrast, color, tint, etc., the method 100 further comprises checking for the orientation of the native image file 134 to make sure that it comports to minimum orientation requirements. Otherwise, if the minimum resolution requirements of the native image file are not met 130, then the method 100 comprises sending an alert to the user 131 notifying him/her that the uploaded or taken image does not meet the predetermined minimum requirements. At this point, the user may be taken back to the screen that allows him/her to upload a photograph 116 to repeat the uploading process, or alternatively, the user may simply choose to continue to edit the image 132. As shown at 140. Once a user is able to upload/capture an image that meets the minimum requirements 136, the method 100 comprises a window/screen that allows the user to select a frame type. If, however, the orientation of the image does not meet the minimum requirements 138, the user may be sent an alert 131, and/or may automatically be taken back to upload an image 116 or proceed to select a frame option 140, which will be described below. For example, the alert 131 may comprise a message indicating that the selected image is formatted as a "portrait" image that will not fit the selected "landscape" orientation, or vice versa.

Figure 5:
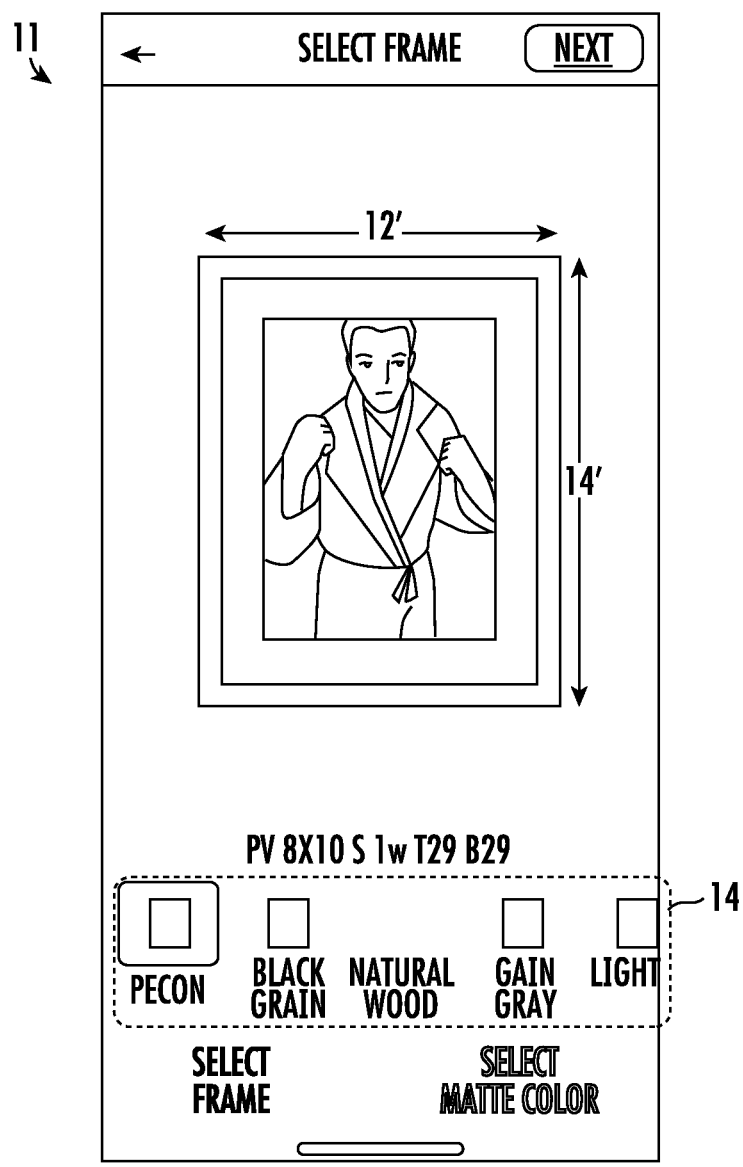
FIG. 5 is a visual representation of yet another embodiment of a device screen of the system according to the present invention showing a frame type selection window.
Figure 6:
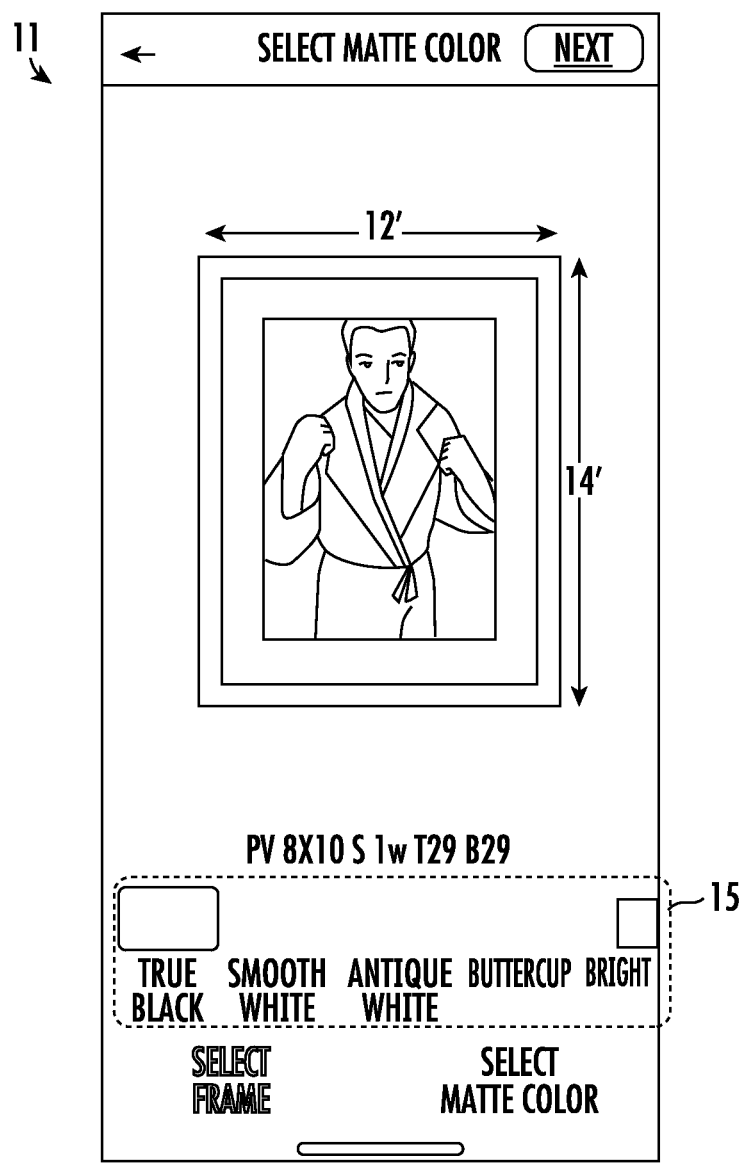
FIG. 6 is a visual representation of a further embodiment of a device screen of the system according to the present invention showing a matte color selection window.

As mentioned above, and with reference to FIGS. 1 and 5, a user may be given the option to select a frame option 140, which comprises making a selection of a plurality of frame materials and/or colors. By way of example only, these frame materials, which are indicated at 14 in FIG. 5, may include, natural wood, dark grey wood, light grey wood, pecan, black grain, etc. As shown at 142 in FIG. 2, and as visually represented at 15 in FIG. 6, the user may also select one of a plurality of matte colors. Such a matte option selection 142 may comprise at least 17, or more, matte colors, e.g., true black, smooth white, antique white, buttercup, bright green, electric blue, pumpkin, holiday red, concord green, etc.

After making both a frame option selection 140 and matte color selection 142, the user may be taken to a screen/window to complete/place an order 144. It is contemplated that the user be shown a "preview" of the order detail and/or a cart. The order detail may have markings showing the overall dimensions of the customized frame as well as the specific size of the order. The order detail may also comprise a summary of the selected frame, e.g., size of frame, material, color, etc. the order detail may also comprise a summary of the selected matte color and dimensions. Here, the system may also show the overall dimensions, including engraving as described herein, and also cost information for the specific order. Here, it is contemplated that the user also has the option to navigate between the order detail and a shopping cart window/screen that will allow him/her to formally place an order.

Figure 7:
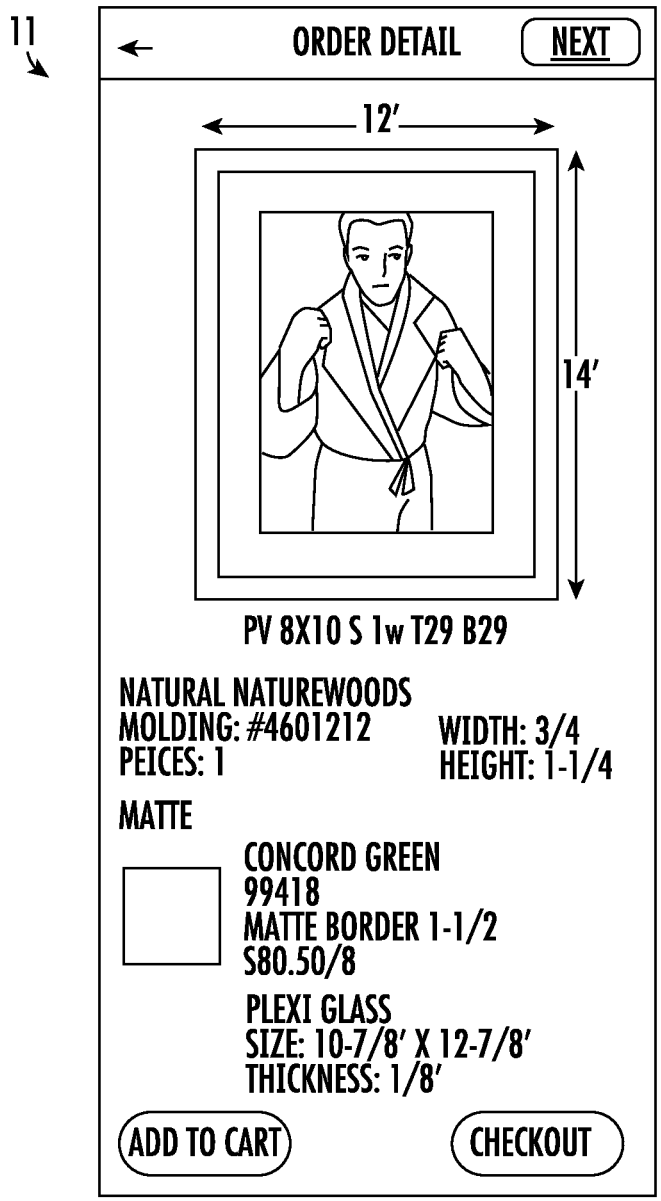
FIG. 7 is a visual representation of an even further embodiment of a device screen of the system according to the present invention showing an order detail window.

At the order detail window, the user will have the option to either go back to further customize and/or revise the current customization of a frame or to access the user's profile to make any changes to the profile information. After an order is placed, this information may be stored in a database of the system 1. In addition, a confirmation page and/or communication, i.e., email, text message, etc., may also be sent to the user. Once a user completes an order, the information provided by the user for the customization may be provided to a manufacturing team that will reproduce the photograph and/or frame according to the user provided specifications. It is within the scope of the present invention the method 100 comprise real-time access to the system's 1 database to access pricing information for various subcomponents of the customizable frame selection, i.e., frame types, matte selections, photograph/frame sizes and layouts, expediting options, geographic location, shipment options, etc., and that a specific pricing item be associated with each specific subcomponent as the user makes his/her selections. As such, the sum of each pricing item associated with each subcomponent may be shown to the user in the ordering window, e.g., FIG. 7, and/or as shown in FIG. 2 at 144.

Figure 8:
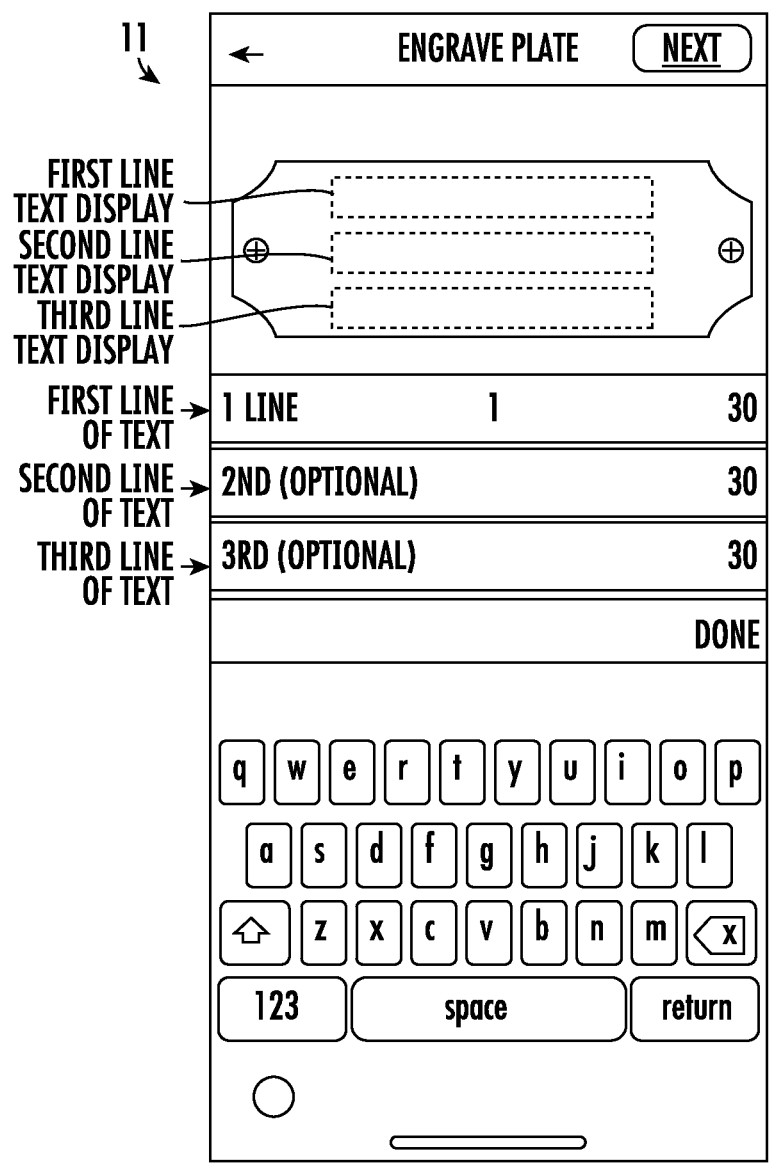
FIG. 8 is a is a visual representation of one embodiment of a device screen of the system according to the present invention showing a plate customization window.

With reference to FIGS. 2 and 8, additional features of the present invention comprise providing a plate selection. A plate and/or plate engraving feature 113 may be provided if a user selects an image orientation 112 that includes an engraving option, which may include, for example, a plate that the user may customize with engraved text. Thus, the user may select from various predetermined plate colors and/or materials. Further, and with specific reference to FIG. 8, after selecting a specific plate color and/or material, it is contemplated that the user has the option to customize up to three lines of text engraving. Here, the user will only be required to enter at least one character in the first line, but may enter at least one character in the second and/or third lines if desired. For example, the user will be given the option to first enter the desired text in the first line, and only after entering at least one character in the first line, will the user be given the option to proceed to the second line. Thereafter, the user may enter text in the second line. At this juncture, if the user deletes all of the entered text in the first line, the all of the text in the subsequent line, i.e., the second, line will be automatically erased. Only after entering at least one character in the second line, will the user be given the option to proceed to the third line. At this juncture, if the user erases all of the entered text in the first line, any entered text in any subsequent line, i.e., the second or third line will automatically be erased, and the user will be given the option to enter text starting on the first line. Also at this juncture, if the user erases all of the entered text in the second line, this will not have any effect on the text previously entered in the first line, but it will erase all of the text entered in the subsequent line(s), in this case, only the third line. It is envisioned that the foregoing will at least partially reduce user error associated with skipping lines and/or mistakenly entering text in unsated lines, as it will force the user to re-enter the engraving text in subsequent lines if the user deletes characters from a previous line.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for customizing a digital image display frame, the system comprising:
    a user device comprising a screen operatively configured with a processor to receive a plurality of user selections associated with a customization order of the digital image display frame and to indicate a real-time status of the customization order;
    an electronic platform operatively configured with the user device to receive the plurality of user selections associated with the customization order;
    a server operatively configured to provide a data connection and data transmission between the user device and the electronic platform;
    the processor operatively connected to the user device, the server and the electronic platform;
    a computer readable memory operatively configured with the processor to execute a set of instructions that when executed allow the user to access the electronic platform via the device to:
    select an intended printed image size,
    select an intended printed image orientation,
    select a frame with an engraving component,
    select a matte template,
    upload a digital image,
    edit the digital image,
    select a frame option,
    select a matte option,
    select an option for the engraving component, and
    place the customization order.

2. The system as recited in claim 1 wherein the set of instructions, when executed, allow the user to access the electronic platform with the device to: adjust at least one of a plurality of data characteristics of the digital image; the plurality of data characteristics of the digital image comprising one or more of color, brightness, contrast, sharpness and tint.

3. The system as recited in claim 1 wherein the engraving component comprises at least one engraving line.

4. The system as recited in claim 3 wherein the engraving component comprises at least two engraving lines.

5. The system as recited in claim 4 wherein the set of instructions, when executed, further allow the user to access the platform with the device to:
    enter an engraving text corresponding to a first one of the at least two engraving lines, and
    enter an engraving text corresponding to a subsequent one of the at least two engraving lines.

6. The system as recited in claim 5 wherein the set of instructions, when executed, further allow the user to delete at least a portion of the engraving text corresponding to the first one of the at least two engraving lines and to delete at least a portion of the engraving text corresponding to the subsequent one of the at least two engraving lines.

7. The system as recited in claim 6 wherein the set of instructions, when executed, are configured to automatically and without user prompt delete all of the engraving text corresponding to a previous one of the at least two engraving lines, upon the user deleting at least a portion of the text corresponding to a subsequent one of the at least two engraving lines.

8. The system as recited in claim 1 wherein the engraving component comprises an engraving plate; the set of instructions, when executed, are configured to allow the user to access the platform with the device to: select an option for the engraving plate.

9. A method for customizing a digital image display frame, the method comprising:
    providing a system comprising:
    a user device comprising a screen operatively configured with a processor to receive a plurality of user selections associated with a customization order of the digital image display frame and to display a real-time status of the customization order;
    an electronic platform operatively configured with the user device to obtain the plurality of user selections associated with the customization order;
    a server operatively configured to provide a data connection and data transmission between the user device and the electronic platform;
    the processor operatively connected to the user device, the server and the electronic platform;
    a computer readable memory operatively configured with the processor to execute a set of instructions that when executed allow the user to access the electronic platform via the device to:
    select an intended printed image size,
    select an intended printed image orientation,
    select a frame with an engraving component,
    select a matte template,
    upload at least one digital image,
    edit the digital image,
    select a frame option,
    select a matte option,
    select an option for the engraving component, and
    place the customization order.

10. The method as recited in claim 9 wherein the method further comprises:
    using the device and the electronic platform to select an intended printed image size,
    using the device and the electronic platform to select an intended printed image orientation,
    using the device and the electronic platform to select a matte option,
    using the device and the electronic platform to upload an image,
    using the processor to ensure that the uploaded image meets minimum requirements, and
    if the uploaded image does not meet the predetermined minimum resolution requirements, using the processor and the electronic platform to display an alert on the user device and allowing the user to use the device and the electronic platform to upload a subsequent image.

11. The method as recited in claim 10 wherein the method further comprises:
if the uploaded image meets the predetermined minimum resolution requirements, using the processor and the electronic platform to edit the digital image.

12. The method as recited in claim 10 wherein the method further comprises:
using the processor to check the uploaded image orientation, and
if the uploaded image orientation meets predetermined minimum orientation requirements, using the device and the electronic platform to select a frame option.

13. The method as recited in claim 12 wherein the method further comprises:
using the device and the electronic platform to select a matte option, and
using the device and the electronic platform to select an engraving option.

14. The method as recited in claim 13 wherein the method further comprises:
using the device and the electronic platform to place the customization order.

15. The method as recited in claim 13 wherein the engraving option comprises an engraving plate with at least two engraving lines.

16. The method as recited in claim 15 wherein the set of instructions, when executed, further allow the user to access the platform with the device to:
enter an engraving text corresponding to a first one of the at least two engraving lines, and
enter an engraving text corresponding to a subsequent one of the at least two engraving lines.

17. The method as recited in claim 16 wherein the set of instructions, when executed, further allow the user to delete at least a portion of the engraving text corresponding to the first one of the at least two engraving lines and to delete at least a portion of the engraving text corresponding to the subsequent one of the at least two engraving lines.

18. The method as recited in claim 17 wherein the set of instructions, when executed, are configured to automatically and without user prompt delete all of the engraving text corresponding to the first one of the at least two engraving lines, upon the user deleting at least a portion of the text corresponding to a subsequent one of the at least two engraving lines.

19. The method as recited in claim 17 wherein the set of instructions, when executed, are configured to automatically and without user prompt delete all of the engraving text corresponding to all previous ones of the at least two engraving lines, upon the user deleting at least a portion of the text corresponding to a subsequent one of the at least two engraving lines.

20. A method for customizing a digital image display frame, the method comprising:
providing a system comprising:
a user device comprising a screen operatively configured with a processor to receive a plurality of user selections associated with a customization order of the digital image display frame and to display a real-time status of the customization order;
an electronic platform operatively configured with the user device to obtain a plurality of user selections associated with the customization order;
a server operatively configured to provide a data connection and data transmission between the user device and the electronic platform;
a processor operatively connected to the user device, the server and the electronic platform;
a computer readable memory operatively configured with the processor to execute a set of instructions that when executed allow the user to access the electronic platform via the device to:
select an intended printed image size,
select an intended printed image orientation,
select a frame with an engraving component,
select a matte option,
upload at least one digital image,
edit the digital image,
select a frame option,
select a matte option,
select an option for the engraving component, and
place the customization order,
using the device and the electronic platform to select an intended printed image size,
using the device and the electronic platform to select an intended printed image orientation,
using the device and the electronic platform to select a matte option,
using the device and the electronic platform to upload an image,
using the processor to ensure that the uploaded image meets minimum requirements, and
if the uploaded image does not meet the predetermined minimum resolution requirements, using the processor and the electronic platform to display an alert on the user device and allowing the user to use the device and the electronic platform to upload a subsequent image,
if the uploaded image meets the predetermined minimum resolution requirements, using the processor and the electronic platform to edit the digital image,
using the processor to check the uploaded image orientation,
if the uploaded image orientation meets predetermined minimum orientation requirements, using the device and the electronic platform to select a frame color and frame material, wherein selection of frame and engraving options is enabled only upon confirmation that the uploaded image satisfies resolution and orientation constraints,
using the device and the electronic platform to select a matte color,
using the device and the electronic platform to select an engraving plate, and
using the device and the electronic platform to place the customization order.

* * * * *